(12) United States Patent
Shigekawa et al.

(10) Patent No.: US 8,899,485 B2
(45) Date of Patent: Dec. 2, 2014

(54) READ LABEL USED AS INFORMATION RECORDING MEDIUM AND METHOD FOR RECORDING INFORMATION THEREON

(75) Inventors: Yasushi Shigekawa, Ehime (JP);
Tomohiro Kijima, Ehime (JP)

(73) Assignee: Panasonic Healthcare Co., Ltd., Ehime (JP)

( * ) Notice: Subject to any disclaimer, the term of this patent is extended or adjusted under 35 U.S.C. 154(b) by 99 days.

(21) Appl. No.: 13/703,757

(22) PCT Filed: Apr. 5, 2012

(86) PCT No.: PCT/JP2012/002377
§ 371 (c)(1),
(2), (4) Date: Dec. 12, 2012

(87) PCT Pub. No.: WO2012/144146
PCT Pub. Date: Oct. 26, 2012

(65) Prior Publication Data
US 2013/0082111 A1    Apr. 4, 2013

(30) Foreign Application Priority Data
Apr. 22, 2011  (JP) ................................ 2011-095774

(51) Int. Cl.
*G06K 19/00*    (2006.01)
(52) U.S. Cl.
USPC .......................................... 235/487; 235/488
(58) Field of Classification Search
USPC .................... 235/375, 380, 487, 488
See application file for complete search history.

(56) References Cited

U.S. PATENT DOCUMENTS

| | | | |
|---|---|---|---|
| 6,066,437 A | 5/2000 | Kosslinger et al. |
| 7,498,071 B2 | 3/2009 | Sakuma et al. |
| 2003/0118915 A1 | 6/2003 | Yokozawa |
| 2004/0048172 A1 | 3/2004 | Fischer |
| 2005/0153094 A1 | 7/2005 | Tabata et al. |
| 2009/0035492 A1 | 2/2009 | Amano et al. |
| 2009/0284813 A1 | 11/2009 | Saito |

FOREIGN PATENT DOCUMENTS

| | | |
|---|---|---|
| CN | 1629953 | 6/2005 |
| CN | 1739112 | 2/2006 |
| CN | 101357553 | 2/2009 |
| CN | 101872577 | 10/2010 |
| EP | 1310838 | 5/2003 |
| GB | 2470258 | 10/2013 |
| JP | 10-333574 | 12/1998 |
| JP | 11-198537 | 7/1999 |
| JP | 2000-019963 | 1/2000 |
| JP | 2003-150027 | 5/2003 |
| JP | 2004-070272 | 3/2004 |
| JP | 2005-014492 | 1/2005 |
| JP | 2005-119106 | 5/2005 |

(Continued)

*Primary Examiner* — Karl D Frech
(74) *Attorney, Agent, or Firm* — Hamre, Schumann, Mueller & Larson, P.C.

(57) ABSTRACT

In a read label as an information recording medium and a method for recording information thereon according to the present invention, the read label includes: an adhesive layer 3; a metal film layer 4 disposed on the surface of the adhesive layer 3; and a light-transmissive protective film layer 5 disposed on the surface of the metal film layer 4. The adhesive layer 3 and the light-transmissive protective film layer 5 are larger in thickness than the metal film layer 4, and an evaporated and removed portion is formed in a part of the metal film layer 4 by radiating a laser beam from the side of the light-transmissive protective film layer 5.

9 Claims, 7 Drawing Sheets

(56) References Cited

FOREIGN PATENT DOCUMENTS

| | | |
|---|---|---|
| JP | 2007-313876 | 12/2007 |
| JP | 3148390 U | 2/2009 |
| JP | 2009-286864 | 12/2009 |
| JP | 2001-331109 | 11/2011 |
| WO | WO 98/45827 | 10/1998 |
| WO | WO 2008/032411 | 3/2008 |

READ LABEL USED AS INFORMATION RECORDING MEDIUM AND METHOD FOR RECORDING INFORMATION THEREON

TECHNICAL FIELD

The present invention relates to a read label used as an information recording medium attached to various base materials and a method for recording information thereon.

BACKGROUND ART

FIG. 10 is cross-sectional views of conventional read labels used as an information recording medium. As shown in FIG. 10 (a), the read label used as an information recording medium includes: an adhesive layer 3a disposed on a base material 2a; a pigment layer 17a disposed on the adhesive layer 3a; a laser marking layer 18a disposed on the pigment layer 17a, and a protective film layer 5a disposed on the laser marking layer 18a.

In FIG. 10(b), a color-developed layer 19a is formed by radiating a laser beam 7a onto the laser marking layer 18a from a laser device such as carbon dioxide laser or YAG laser.

At this point, a desired marking position of the laser marking layer 18a is irradiated with the laser beam 7a from the laser device to generate a color only in the desired portion, thereby forming the color-developed layer 19a. The laser beam 7a to be used depends on the material of the laser marking layer 18a. Information is read by distinguishing or identifying the desired marking from a color difference between the color-developed layer 19a and the pigment layer 17a disposed under the laser marking layer 18a (similar techniques are disclosed by, for example, Patent Literatures 1 and 2 listed below as related art documents).

CITATION LIST

Patent Literature

Patent Literature 1: Japanese Utility Model Registration No. 3148390
Patent Literature 2: Japanese Unexamined Patent Application Publication No. 2007-313876

SUMMARY OF INVENTION

Technical Problem

In the above-described conventional configuration of the read label used as an information recording medium on which reading is performed by a reader, for example, a bar code or the like with information recorded thereon is hardly identified from a contrast between the stained protective film layer 5a and the color-developed layer 19a, thereby resulting in a factor that causes a false operation or detection error of the reader. In other words, in the case of adhesion of dirt, the contrast is not made clear only by a color difference, thereby reducing the reliability of reading. Hence, an object of the present invention is to improve the reliability of reading.

Solution to Problem

In order to attain the object, a read label used as an information recording medium of the present invention comprises: an adhesive layer; a metal film layer disposed on the surface of the adhesive layer; and a light-transmissive protective film layer disposed on the surface of the metal film layer, wherein the adhesive layer and the light-transmissive protective film layer are larger in thickness than the metal film layer, and an evaporated and removed portion is provided in a part of the metal film layer. Thus, the desired object is attained.

Further, a method for recording information on the read label used as an information recording medium of the present invention comprises radiating a laser beam on the metal film layer from the side of the light-transmissive protective film layer to evaporate and remove a part of the metal film layer and thus form an evaporated and removed portion. Thus, the desired object is attained.

DESCRIPTION OF EMBODIMENTS

The following will specifically describe a read label used as an information recording medium according to the present invention in reference to the accompanying drawings.

First Embodiment

Figure 1:
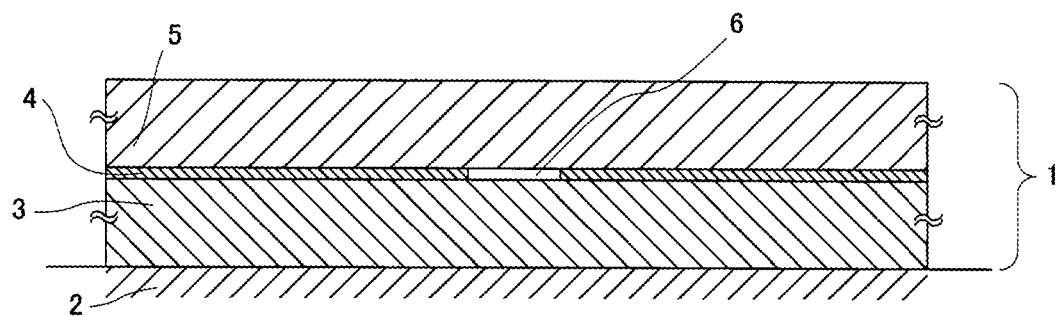
FIG. 1 is a cross-sectional view of a read label used as an information recording medium according to a first embodiment of the present invention.

FIG. 1 is a cross-sectional view of a read label used as an information recording medium according to a first embodiment of the present invention. FIG. 2 is cross-sectional views illustrating laser processing in a manufacturing process of the read label used as an information recording medium according to the first embodiment of the present invention. FIG. 3 is another cross-sectional view of the read label used as an information recording medium according to the first embodiment of the present invention.

A range of equipment and articles including testing samples and physically distributed and commercial products contain information such as the contents and histories. Such information is written on read labels, the read labels are attached to the equipment and articles, and the information recorded on the read labels is read and managed as necessary. The present invention relates to the read label used as an information recording medium where the information is recorded and a method for recording the information. The following will describe the read label used as an information recording medium and the method for recording the information, the read label being attached to a base plate, that is, a surface of the equipment or article or of a container in which the equipment or article is housed.

In FIG. 1, a read label 1 used as an information recording medium is composed of an adhesive layer 3 attached onto a base plate 2 of the equipment, a metal film layer 4 disposed on the surface of the adhesive layer 3, and a light-transmissive protective film layer 5 disposed on the surface of the metal film layer 4.

A feature of the present embodiment is that an information recording portion 6 is formed by causing the metal film layer 4 to evaporate without having the effect of processing on the protective film layer 5 and the base plate 2 to which the label as an information recording medium is attached.

As described above, the metal film layer 4 is formed on the adhesive layer 3 which is sufficiently thicker than, for example, at least ten times as thick as the metal film layer 4, and the information recording portion 6 containing no metal film layer 4 is formed in the metal film layer 4. Thus, there is a clearer contrast between the presence and absence of the metal film layer 4 than between different colors, so that reading is facilitated. As a result, for example, identification errors can be prevented when the label is read by a reader even if the transparent protective film layer is stained, so that the reliability of reading by the reader can be enhanced.

Further, unlike in the related art, it is not necessary to form complex multiple layers including a protective film layer, a laser marking layer, a pigment layer, and an adhesive layer, thereby facilitating manufacturing and reducing cost.

In the above-described evaporation, a quantity of heat is concentrated by laser light irradiation on a small area of the target metal film layer 4, which is considerably thinner than the protective film layer 5 and the adhesive layer 3, to increase energy density, so that the area of the metal layer film layer 4 is vaporized.

Further, the adhesive layer 3 is sufficiently thicker than the metal film layer 4, so that the vaporized and gasified metal film layer 4 can be contained in the adhesive layer 3. Specifically, in the laser light irradiation, a laser beam passes through the light-transmissive protective film layer 5, vaporizes the metal film layer 4, and softens the adhesive layer 3, so that the vaporized and gasified metal film layer 4 can be contained in the softened portion of the adhesive layer 3.

The reason why the adhesive layer 3 is softened will be more specifically described. The adhesive layer 3 may be also light transmissive. However, the surface of the adhesive layer 3 on the side of the metal film layer 4 is subjected to heat and pressure by a heated roll member 15 in the step of FIG. 5 which will be described later, and thus becomes rough (uneven), thereby allowing a radiated laser beam to be absorbed in the adhesive layer 3 without passing through. In addition, the adhesive layer 3 is softened due to heat supplied during the evaporation of the metal film layer 4.

Moreover, the adhesive layer 3 is softened, so that a containing portion (no reference numeral assigned) which contains the evaporated metal film layer 4 is formed. The containing portion is formed in the softened portion of the adhesive layer 3 which is in contact with the lower part of the evaporated and removed portion of the metal film layer 4.

Further, since a laser beam does not pass through the adhesive layer, the base plate 2 is not affected by a laser beam.

Accordingly, the vaporized and gasified metal film layer 4 is contained in the adhesive layer 3, and thus the gasified metal film layer 4 is prevented from affecting the information recording portion 6 and the protective film layer 5 without being contained anywhere. Hence, information can be accurately recorded.

Figure 2A:
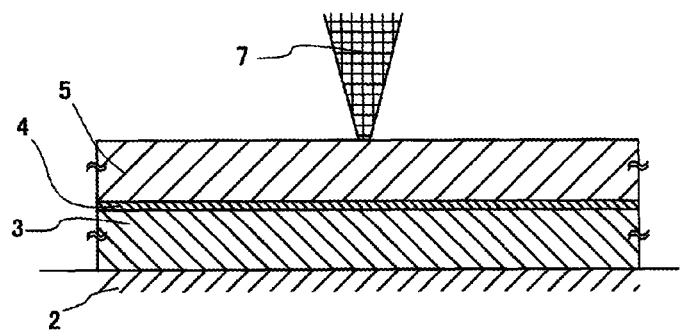
FIG. 2 is cross-sectional views illustrating laser processing in a manufacturing process of the read label used as an information recording medium according to the first embodiment of the present invention.
Figure 3:
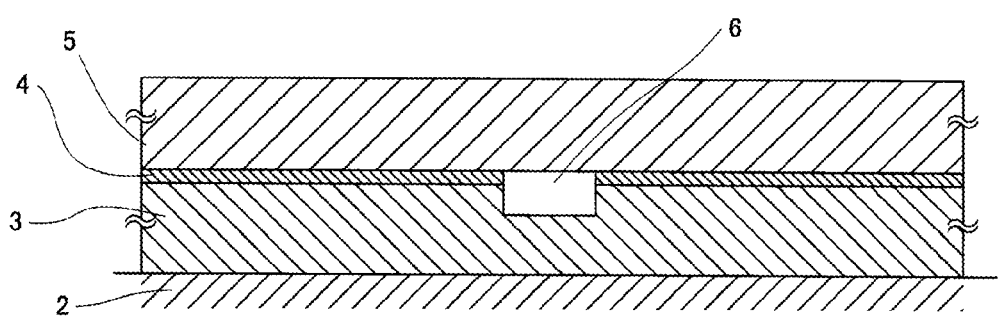
FIG. 3 is another cross-sectional view of the read label used as an information recording medium according to the first embodiment of the present invention.

FIG. 2(a) shows that information is recorded on the read label 1 as an information recording medium by radiating a laser beam 7 in the shape of predetermined characters, bar codes, and the like from the side of the light-transmissive protective film layer 5.

That is, information is recorded by radiating the laser beam 7 from the side of the transparent protective film layer 5 in a state where the read label 1 as an information recording medium is attached onto the base plate 2 of the equipment via the adhesive layer 3.

In the present embodiment, a laser beam having a second harmonic wavelength of 532 nm or a YAG laser beam having a wavelength of 1064 nm can be used for the laser beam 7.

For example, the laser device may be YV04 laser (MD-V9600 Series/wavelength: 1064 nm/average power: 8 W) manufactured by Keyence Corporation. The processing can be performed with irradiation parameters set as follows: laser output: 60% to 80%; Q-switching frequency: 1000 KHz; and scanning speed: 2000 mm/sec to 2200 mm/sec. Further, the laser device for the second harmonic wavelength of 532 nm may be SHG laser (LP-G Series) manufactured by Panasonic Electric Works SUNX Co., Ltd.

Irradiation conditions vary depending on the width and accuracy of removal, and thus are not necessarily limited to those as described above.

Figure 2B:
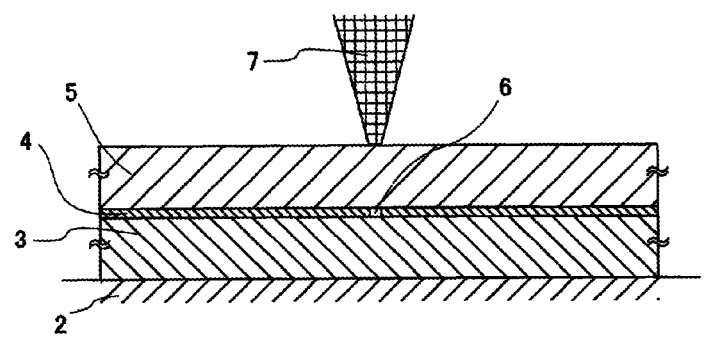

In FIG. 2(b), the information recording portion 6 can be formed of only the evaporated and removed portion or of the evaporated and removed portion and the metal film layer 4 adjacent thereto by evaporating only a predetermined portion of the metal film layer 4 through the processing under such irradiation conditions as described above. In other words, information may be recorded by forming characters and/or codes as data in the evaporated and removed portion, that is, the information recording portion 6. Alternatively, information may be recorded by forming a barcode in the evaporated and removed portion, that is, the information recording portion 6 and the metal film layer 4 adjacent thereto.

Under the above-described conditions of the present embodiment, the base plate 2 may be made of an acrylic resin material, the metal film layer 4 may be an aluminum vapor-deposited film, and the protective film layer 5 may be made of light-transmissive wax resin.

With this configuration, the radiated laser beam 7 can pass through the light-transmissive protective film layer 5 to process and evaporate the metal film layer 4 composed of the aluminum vapor-deposited film, so that the predetermined information recording portion 6 can be formed.

This is because, based on the relation between the absorption rate of laser light of the material and the wavelength of laser light, the light-transmissive protective film layer 5 made of the resin material allows the passage of the laser beam 7 having the wavelength of the present embodiment, enabling the metal film layer 4 formed by vapor-deposition or sputtering to evaporate by means of absorption of the laser beam 7. The protective film layer 5 may have such light transmittance that a laser beam can pass through the protective film layer 5 to evaporate the metal film layer 4. In the case where the presence or absence of the metal film layer 4 is determined by detection of reflected waves, such light transmission characteristics of the protective film layer 5 as to allow the passage of a large amount of visible light are not required as long as the laser beam 7 can be passed through the protective film layer 5.

The processing will be specifically described below. As described above, the metal film layer 4 can absorb a laser beam 7 having the wavelength of the present embodiment. Thus, power from the laser beam 7 is absorbed by the metal film layer 4 to heat a portion of the metal film layer 4 where the power is absorbed. The heated metal film layer 4 is gasified and evaporated, and only the predetermined portion of the metal film layer 4 irradiated with the laser beam 7 is removed, so that the information recording portion 6 can be formed.

Such heat processing involves: focusing and concentrating the laser beam 7 on a predetermined point through a lens disposed in the laser device; intensively targeting at a workpiece only within the diameter of the focal spot to gasify the workpiece with heat; and trimming off and removing the predetermined point.

In the case of the laser beam 7 of the present embodiment, the spot diameter is about 50 μm, and the predetermined point is trimmed off by scanning the laser beam 7 along the content and width of the predetermined point to be formed. For example, in the case where a line forming a barcode is removed, the predetermined line width of the barcode can be achieved by scanning the laser beam 7 along the predetermined line width multiple times.

In the present embodiment, the metal film layer 4 is an aluminum vapor-deposited film. However, the metal film layer 4 may be made of other materials such as palladium, copper, nickel, silver, gold, and iron which have a high absorption rate of laser light and can be typically vapor-deposited and sputtered to form a thin film.

The above-described materials have absorption rates of laser light of 5% to 10% or more with respect to the laser wavelength of the present embodiment. In the characteristics of the materials, the absorption rates of laser light tend to increase at wavelengths of 532 nm to 1064 nm in which the materials can be subjected to processing by the laser beam 7.

Further, in the present embodiment, the second harmonic wavelength of 532 nm and the YAG laser wavelength of 1064 nm are used. However, semiconductor laser with a wavelength of 532 nm to 1064 nm may be used in view of the above-described relation between the absorption rate of laser light in the material characteristics and the wavelength of a laser beam. Moreover, the processing is enabled using laser sources such as fiber laser and YV04 laser capable of outputting the same wavelength as the YAG laser wavelength of 1064 nm.

Figure 2C:
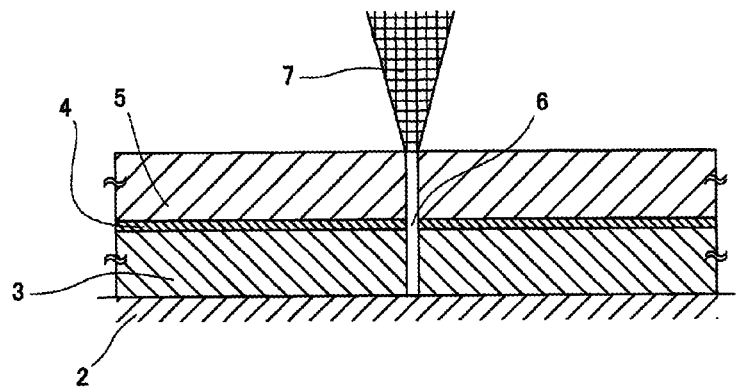

When the same processing was performed using $CO_2$ laser with a wavelength of 10.6 μm or 9.3 μm for the laser beam 7, since the resin material of the protective film layer 5 has a high absorption rate of laser light having the wavelength, the protective film layer 5 underwent processing and thus became uneven as shown in FIG. 2(c). Thus, disadvantageously, the processing and reading of the information recording portion 6 could not be performed with high accuracy.

In the laser processing of the present embodiment, the laser beam 7 passes through the protective film layer 5 to remove only the metal film layer 4, thereby preventing metal work pieces from being scattered. Further, since the predetermined portion of the metal film layer 4 is irradiated with the laser beam 7 to perform laser scanning at high speed, the layers above and below the metal film layer 4 and the metal film layer 4 excluding the predetermined portion are hardly affected. Thus, a desired portion of the metal film layer 4 can be removed for formation with high efficiency and accuracy. Since the metal film layer 4 to be removed by laser processing is reduced in thickness to be considerably smaller than the whole layers forming the film, the protective film layer 5 and the like are neither affected nor deformed. The protective film layer 5 allows the passage of the laser beam 7, and is thus neither removed nor deformed directly. This enables the metal film layer 4 to be removed in a closed state in which the metal film layer 4 is held between the protective film layer 5, the adhesive layer 3, and the base plate 2.

In FIG. 3, even if the portion to be evaporated by the laser beam 7 contains the adhesive layer 3, the portion is originally the evaporated portion of the metal film layer 4 and thus does not affect reading.

As described above, the read label 1 as an information recording medium of the present embodiment includes the adhesive layer 3, the metal film layer 4, and the protective film layer 5. The adhesive layer 3 is made thicker than the metal film layer 4, so that a desired information recording portion 6 can be formed by evaporating and removing the metal film layer 4 with the laser beam 7. Thus, a read label showing a clear contrast can be provided.

Second Embodiment

Figure 4:
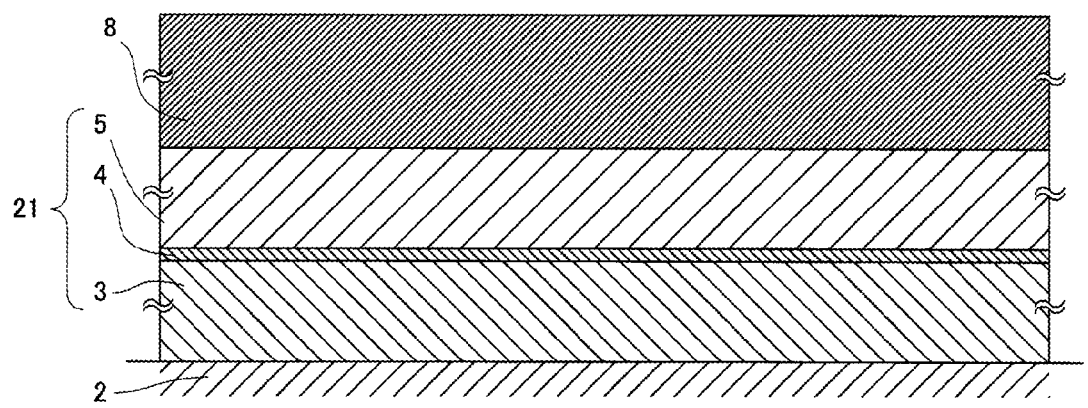
FIG. 4 is a cross-sectional view of a foil printing film according to a second embodiment of the present invention.

FIG. 4 is a cross-sectional view of a foil printing film according to a second embodiment of the present invention. FIG. 5 is cross-sectional views illustrating manufacture of a read label as an information recording medium from a foil printing film according to the second embodiment of the present invention.

The second embodiment describes a read label as an information recording medium manufactured by thermally transferring information to be recorded onto a label, and a method for recording the information. The label includes an adhesive layer, a metal film layer, and a protective film layer which are stacked on a base plate. In the read label as an information recording medium of the second embodiment, a foil printing film including a base film disposed on a label serving as information is attached to the base plate, and the foil printing film is partly peeled off, so that the information is recorded on the base plate according to the presence or absence of the label.

As shown in FIG. 4, the read label as an information recording medium of the present embodiment is manufactured by removing a foil printing film including a label 21 and a base film 8 while leaving parts of the label 21. The label 21 includes an adhesive layer 3, a metal film layer 4, and a protective film layer 5 stacked on top of each other. For example, the foil printing film includes a PET film disposed as the base film 8 on the label 21 including the adhesive layer 3, the metal film layer 4, and the protective film layer 5 stacked on top of each other.

In recording information, first, a mold release layer (not shown) is applied on a surface of the base film 8 which is in contact with the protective film layer 5. This facilitates the removal of the base film 8 by thermal transfer, which will be described below, from the label 21 to be left as the read label as an information recording medium.

In this case, the metal film layer 4 is separately formed by vapor deposition and the adhesive layer 3 is applied thereon. The type of adhesive for the adhesive layer 3 is changed according to the material of a base plate 2, that is, a workpiece onto which the read label as an information recording medium is thermally transferred. For example, the base plate 2 may be made of a transparent acrylic material.

A further description will be given in reference to FIG. 5.

In the following description, the used base plate 2 is cylindrically-shaped. However, the base plate 2 is shown substantially linearly in an enlarged view of FIG. 5.

Figure 5A:
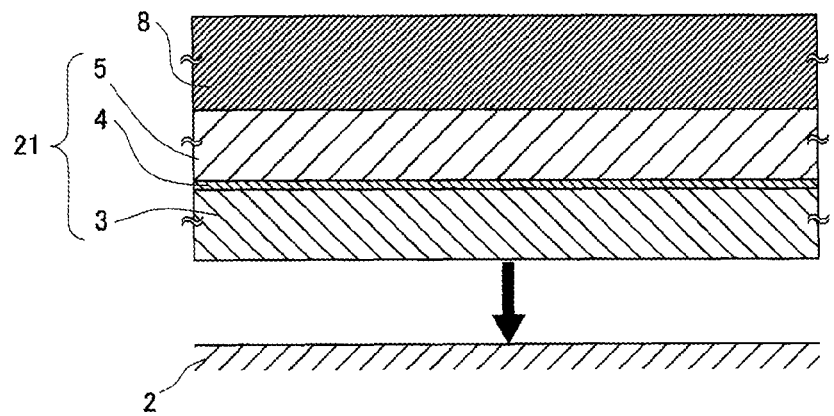
FIG. 5 is cross-sectional views illustrating manufacture of a read label used as an information recording medium from a foil printing film according to the second embodiment of the present invention.

First, in FIG. 5(a), the foil printing film composed of four layers including the adhesive layer 3, the metal film layer 4, the light-transmissive protective film layer 5, and the base film 8 is disposed on the base plate 2.

Figure 5B:
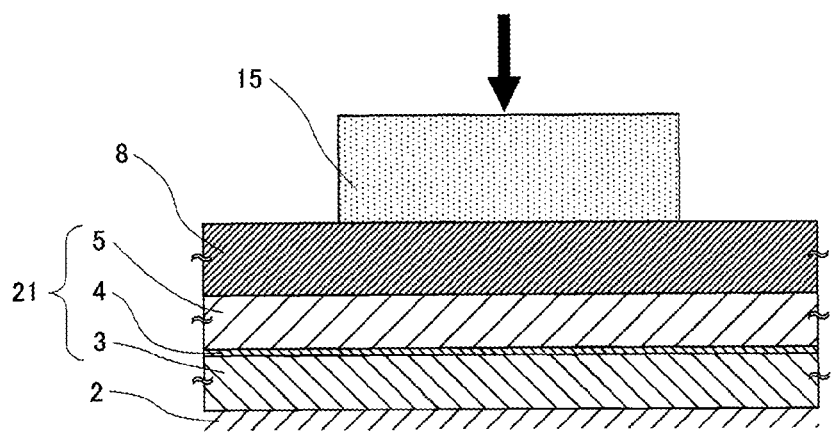

Next, in FIG. 5(b), the foil printing film is pressed by a heated roll member 15 to a predetermined portion of the base plate 2 from the side of the base film 8 which is the top layer of four layers of the foil printing film. In the present embodiment, the used heated roll member 15 is made of fluorine-based rubber having hardness of 80 degrees, and the foil printing film is transferred under moderate pressure. At this point, the roll member 15 is pushed to a portion of the label 21 to be left as recorded information.

Figure 5C:
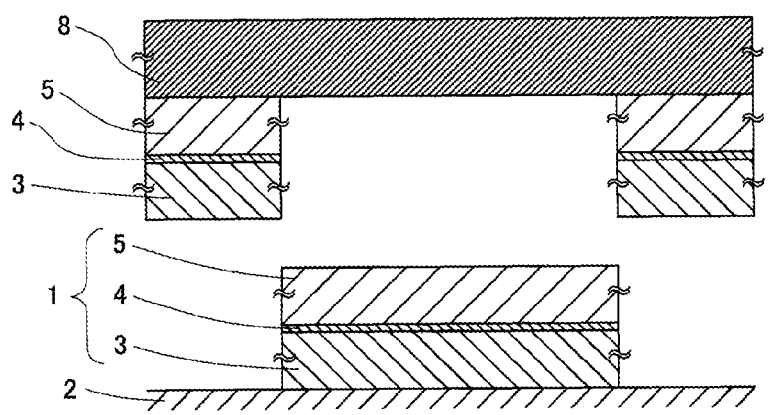

Accordingly, in FIG. 5(c), the label 21 composed of three layers including the adhesive layer 3, the metal film layer 4, and the light-transmissive protective film layer 5 is separated from the base film 8, so that the film having a three-layered structure, that is, the label 21 composed of three layers including the adhesive layer 3, the metal film layer 4, and the light-transmissive protective film layer 5 is transferred from the base film 8 onto the base plate 2. Thus, a read label 1 as an information recording medium is formed.

Since the read label 1 as an information recording medium can be easily manufactured thus using the foil printing film, the read label 1 as an information recording medium can be formed in an intricately-shaped product including the curved base plate 2 or a part of the product. Further, the read label 1 as an information recording medium is configured according to the presence or absence of the label 21 containing the metal film layer 4, thereby increasing the contrast of the read label to enhance the reliability of reading similarly to the first embodiment. In the present embodiment, each of the layers may have any thickness.

In the present embodiment, the film can be transferred onto the curved surface of the base plate 2 being turned by the heated roll member 15 set at 180° C. to 200° C. The foil printer used in the present embodiment may be, for example, a foil printer manufactured by Navitas Co., Ltd., and the foil printing film may be a film manufactured by Murata-Kimpaku Co., Ltd. Specific examples of dimensions of the layers are provided as follows: the base film 8 is about 16 μm; the mold release layer as the protective film layer 5 is 1 μm to 1.5 μm; the aluminum vapor-deposited layer as the metal film layer 4 is 500 Å (0.05 μm); and the adhesive layer 3 is 2 μm to 3 μm.

Third Embodiment

Figure 6:
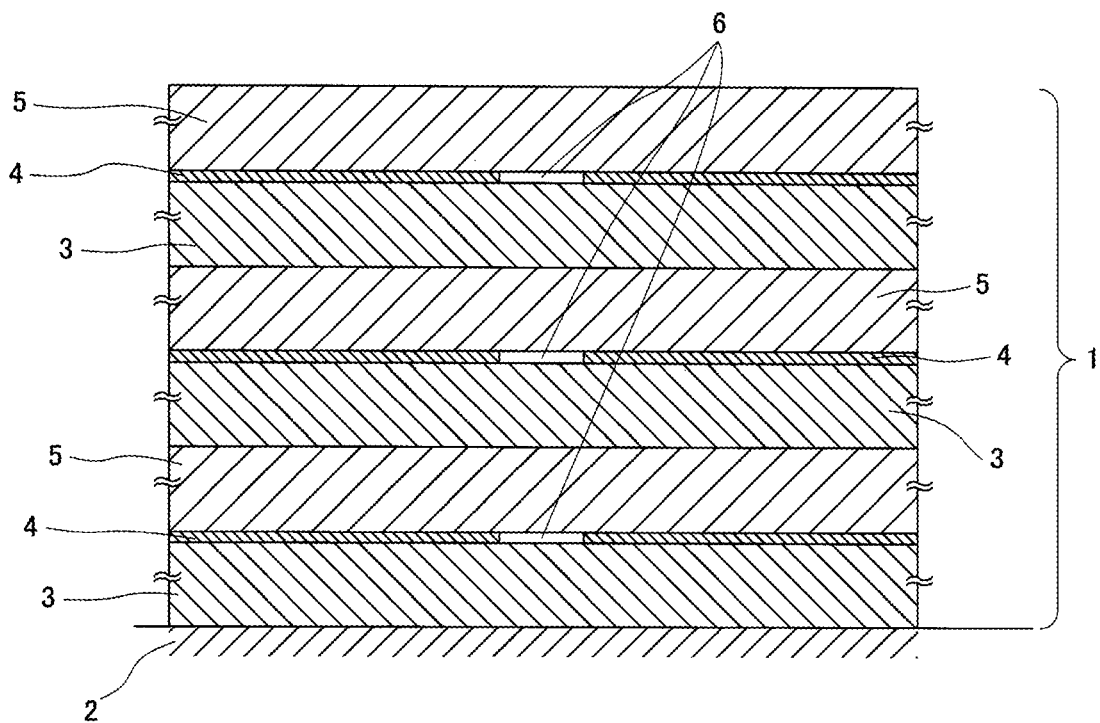
FIG. 6 is a cross-sectional view of read labels used as an information recording medium in multiple layers according to a third embodiment of the present invention.

FIG. 6 shows read labels as an information recording medium in multiple layers according to a third embodiment of the present invention, the read labels being obtained by stacking the read labels 1 as an information recording medium according to the first embodiment in multiple layers.

In FIG. 6, for example, films each including a light-transmissive protective film layer 5, a metal film layer 4, and an adhesive layer 3 are transferred and printed onto a base plate 2 multiple times to form multiple layers each including the light-transmissive protective film 5, the metal film layer 4, and the adhesive layer 3. Thereafter, the multiple layers are irradiated with a laser beam 7 to form information recording portions 6.

In the present embodiment, the films are thermally transferred multiple times in the same position. The presence of the adhesive layer 3 enables the films to be thermally transferred any number of times, thereby achieving stacked layers.

As described above, the films each including the information recording portion 6 formed in the metal film layer 4 are stacked in multiple layers. Thus, even if the protective film layer 5 or the metal film layer 4 of the read label 1 as an information recording medium is melted due to corrosion caused by cleaning or immersion in a cleaning liquid such as alcohol, the upper read label 1 for an information recording medium can be removed to leave the lower read label 1 for an information recording medium for achieving the object and feature of a read label.

Also in the case where reading cannot be performed due to peeling off during carriage of the base plate, the upper read label 1 as an information recording medium can be removed to leave the lower read label 1 as an information recording medium for achieving the object and feature of a read label. Thus, a highly durable read label can be obtained by stacking the read labels 1 as an information recording medium in multiple layers.

Fourth Embodiment

Figure 7:
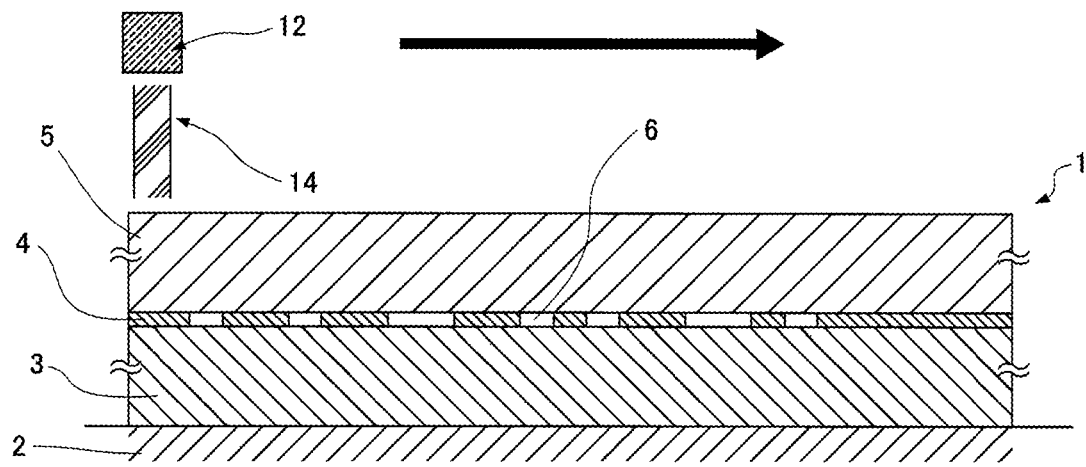
FIG. 7 is a cross-sectional view illustrating a method for reading a read label used as an information recording medium according to a fourth embodiment of the present invention.
Figure 8A:
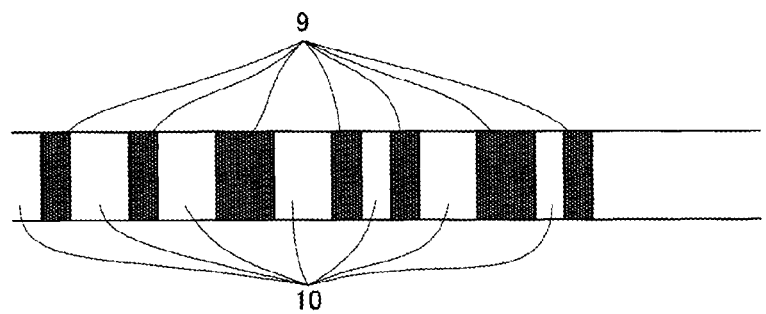
FIG. 8 shows that a bar code is formed in the read label used as an information recording medium according to the fourth embodiment of the present invention.
Figure 8B:
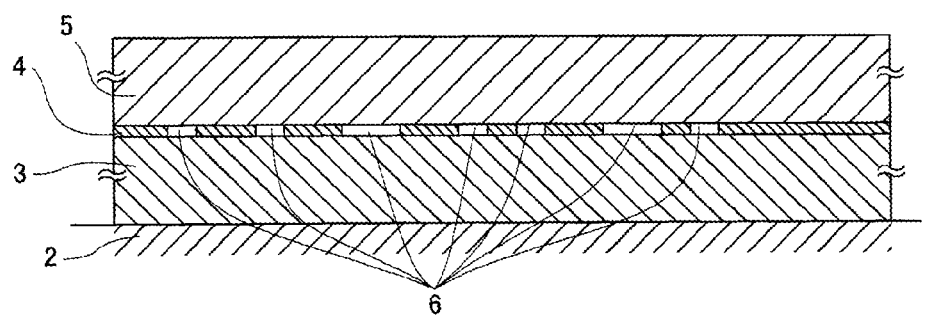
Figure 9:
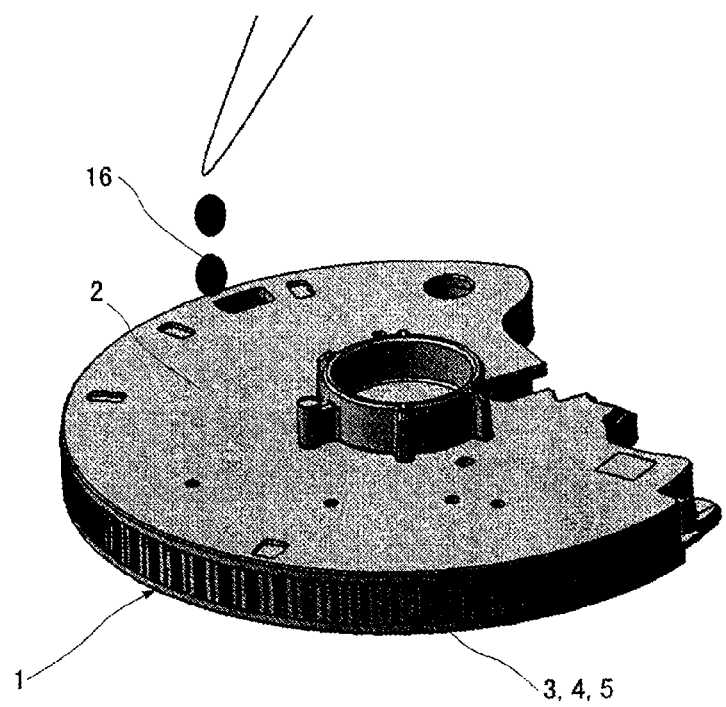
FIG. 9 is a perspective view showing that the bar code is formed on the read label used as an information recording medium according to the fourth embodiment of the present invention.
Figure 10:
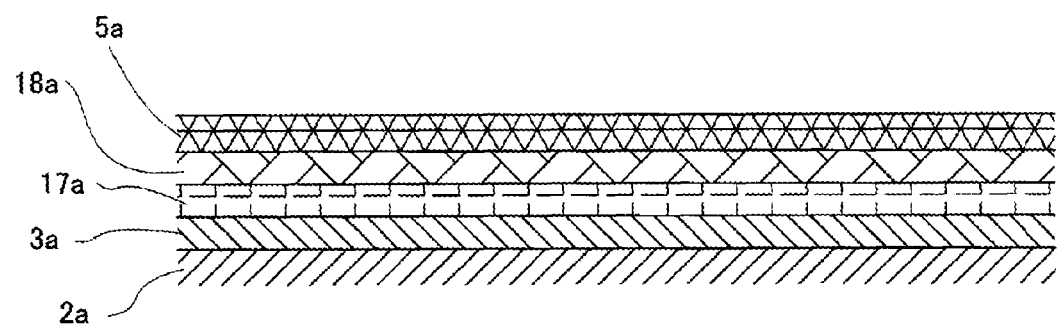
FIG. 10 is cross-sectional views of conventional read labels used as an information recording medium.
Figure 10:
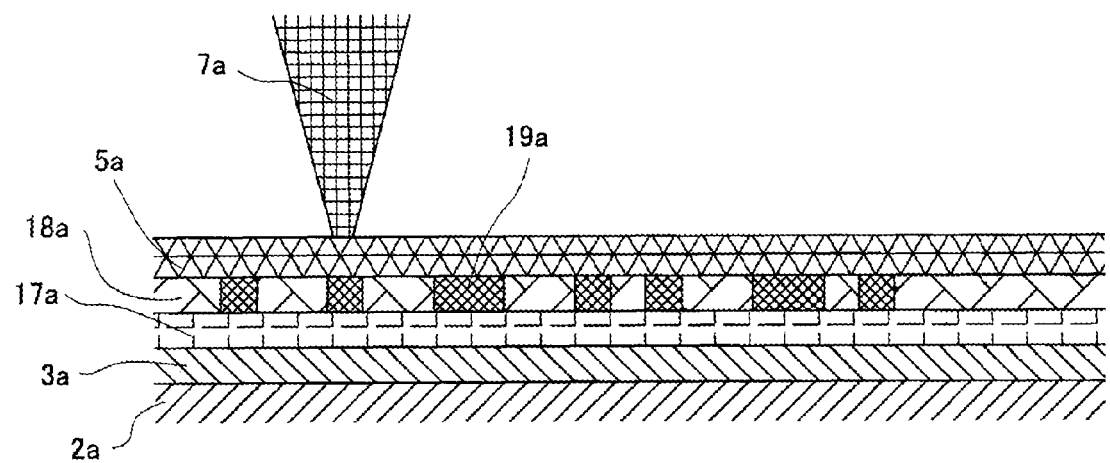

FIG. 7 is a cross-sectional view illustrating a method for reading a read label for an information recording medium according to a fourth embodiment of the present invention. FIG. 8(a) is a planar view of a bar code formed on the read label as an information recording medium according to the fourth embodiment of the present invention, and FIG. 8(b) is a cross-sectional view. FIG. 9 is a perspective view of the bar code formed on the read label as an information recording medium according to the fourth embodiment of the present invention.

In FIG. 7, a read label 1 as an information recording medium or a reader 12 is moved to recognize the content of the read label 1 as an information recording medium by the reader 12. In reading, the accuracy of reading is determined according to the light and shade or the contrast of an information recording portion 6 in the read label 1 as an information recording medium. The durability of the information recording portion 6 is a factor that causes a detection error or false operation. Thus, the durability of the information recording portion 6 is quite important for achieving reading.

In each of the read labels 1 as an information recording medium according to the embodiments of the present invention, the metal film layer 4 is a thin film formed by vapor-deposition or sputtering so as to have a metal surface. Thus, when a read laser beam 14 is used as reading means, the reflectivity of the laser beam is quite high, so that reflected signals can be obtained with high probability. In other words, a signal difference between the reflected signal and an unreflected signal is extremely large to increase the contrast, thereby achieving highly favorable results of reading with high probability.

FIG. 8 shows the information recording portion 6 formed of the barcode. Acrylic resin as a base plate 2 is disposed behind a transmission-side barcode 9 for performing reading and a metal film layer 4 is disposed as a reflection-side barcode 10, resulting in a bar code with an increased and clear contrast.

FIG. 9 shows that the read label 1 as an information recording medium can be applied to the base plate 2 having a curved outer peripheral surface such as a medical biosensor for a blood test and the like.

In this case, the surface of the read label 1 as an information recording medium is protected by a protective film layer 5 even if blood 16 and the like adhere to the surface, and information can be read because the contrast of markings is clear even when the protective film layer 5 is stained with the blood 16. Thus, the types and manufacturing information of the biosensor can be read without false recognition, so that highly reliable measurement of blood and the like can be achieved.

INDUSTRIAL APPLICABILITY

As described above, in the present invention, information is recorded by evaporating and removing a metal film layer, thereby providing a clearer contrast than information recording using a color difference. As a result, for example, the present invention provides resistance to stains on a transparent protective film layer, thereby increasing the reliability of reading by a reader.

Therefore, the present invention is applicable to various equipment.

The invention claimed is:

1. A read label used as an information recording medium comprising:
   an adhesive layer;
   a metal film layer disposed on a surface of the adhesive layer; and
   a light-transmissive protective film layer disposed on a surface of the metal film layer, wherein
   the adhesive layer and the light-transmissive protective film layer are larger in thickness than the metal film layer, and
   an evaporated and removed portion is formed in a part of the metal film layer,
   wherein the adhesive layer and the light-transmissive protective film layer are at least ten times as thick as the metal film layer, and a containing portion that contains an evaporated metal from the metal film layer is present in a portion of the adhesive layer which is in contact with the evaporated and removed portion of the metal film layer.

2. The read label used as an information recording medium according to claim 1, wherein an information recording portion is formed of the evaporated and removed portion and a portion of the metal film layer adjacent to the evaporated and removed portion.

3. The read label used as an information recording medium according to claim 1, wherein the metal film layer is made of at least one of aluminum, palladium, copper, nickel, silver, gold, and iron.

4. The read label used as an information recording medium according to claim 1, wherein the metal film layer is formed on the surface of the adhesive layer by vapor-deposition or sputtering.

5. A read label used as an information recording medium comprising the read labels used as an information recording medium according to claim 1 stacked in multiple layers.

6. A method for recording information on a read label used as an information recording medium comprising an adhesive layer, a metal film layer disposed on a surface of the adhesive layer, and a light-transmissive protective film layer disposed on a surface of the metal film layer, wherein the adhesive layer and the light-transmissive protective film layer are larger in thickness than the metal film layer, and an evaporated and removed portion is provided in the metal film layer,
   the method comprising radiating a laser beam on the metal film layer from a side of the light-transmissive protective film layer to evaporate and remove a part of the metal film layer and thus form an evaporated and removed portion,
   wherein the adhesive layer and the light-transmissive protective film layer are at least ten times as thick as the metal film layer, and a containing portion that contains an evaporated metal from the metal film layer is present in a portion of the adhesive layer which is in contact with the evaporated and removed portion of the metal film layer.

7. The method for recording information on the read label used as an information recording medium according to claim 6, wherein the laser beam has a YAG laser wavelength or a second harmonic wavelength.

8. The method for recording information on the read label used as an information recording medium according to claim 6, further comprising forming a rough surface on a portion in the surface of the adhesive layer facing the evaporated and removed portion of the metal film layer before the laser beam is radiated.

9. The method for recording information on the read label used as an information recording medium according to claim 6, further comprising bonding a surface of the adhesive layer opposite to the metal film layer to a base material, before radiating the laser beam from the side of the light-transmissive protective film layer.

* * * * *